(12) United States Patent
Levasseur et al.

(10) Patent No.: US 11,305,786 B2
(45) Date of Patent: Apr. 19, 2022

(54) MAINTAINING CONSISTENT SENSOR OUTPUT

(71) Applicant: Autoguide, LLC, Chelmsford, MA (US)

(72) Inventors: David Levasseur, Chelmsford, MA (US); Michael Cullinane, Chelmsford, MA (US)

(73) Assignee: AUTOGUIDE, LLC., Chelmsford, MA (US)

( * ) Notice: Subject to any disclaimer, the term of this patent is extended or adjusted under 35 U.S.C. 154(b) by 11 days.

(21) Appl. No.: 16/865,139

(22) Filed: May 1, 2020

(65) Prior Publication Data

US 2021/0339769 A1 Nov. 4, 2021

(51) Int. Cl.
*B60W 60/00* (2020.01)

(52) U.S. Cl.
CPC .... *B60W 60/0011* (2020.02); *B60W 60/0018* (2020.02); *B60W 60/0025* (2020.02)

(58) Field of Classification Search
CPC ......... B60W 60/0011; B60W 60/0025; B60W 60/0018; B60W 2554/20
See application file for complete search history.

(56) References Cited

U.S. PATENT DOCUMENTS

| | | | |
|---|---|---|---|
| 6,470,251 B1 * | 10/2002 | Enix | E02F 3/847 172/4.5 |
| 6,952,488 B2 | 10/2005 | Kelly et al. | |
| 9,715,232 B1 | 7/2017 | Fischer et al. | |
| 10,007,266 B2 | 6/2018 | Fischer et al. | |
| 10,409,293 B1 * | 9/2019 | Pounds | G01S 13/865 |
| 2008/0159841 A1 * | 7/2008 | Keller | B66F 9/24 414/718 |
| 2012/0235851 A1 * | 9/2012 | Park | G01S 13/931 342/70 |
| 2017/0336792 A1 | 11/2017 | Gdalyahu et al. | |
| 2018/0134531 A1 * | 5/2018 | Tanaka | B66F 9/16 |
| 2018/0281178 A1 | 10/2018 | Jacobsen | |
| 2019/0137991 A1 * | 5/2019 | Agarwal | G05D 1/0088 |
| 2019/0145784 A1 | 5/2019 | Ma et al. | |

(Continued)

FOREIGN PATENT DOCUMENTS

| | | |
|---|---|---|
| KR | 10-2007-0008088 A | 1/2007 |
| KR | 10-2016-0040084 A | 4/2016 |
| KR | 10-2019-0062043 A | 6/2019 |

OTHER PUBLICATIONS

Dubinskij Andrej Igorevich, Method for gyroscopic stabilization of a lidar in the horizon plane and a device for implementation thereof, May 2017, English Translation of EA 026774 B1 (Year: 2017).*

(Continued)

*Primary Examiner* — James J Lee
*Assistant Examiner* — Matthew L Parulski
(74) *Attorney, Agent, or Firm* — Burns & Levinson LLP

(57) ABSTRACT

An example autonomous vehicle includes a body configured for movement along a surface, a sensor on the body to output a signal in a plane and to obtain information about an environment based on the signal, and a control system to use the information to determine a location of the autonomous vehicle in the environment. The sensor is configured to keep constant the plane of the signal for different positions of the body.

20 Claims, 14 Drawing Sheets

(56) References Cited

U.S. PATENT DOCUMENTS

| | | | |
|---|---|---|---|
| 2019/0289772 A1* | 9/2019 | Murphy | A01B 79/005 |
| 2019/0384314 A1 | 12/2019 | Jacobsen | |
| 2020/0004247 A1 | 1/2020 | Jacobsen et al. | |
| 2020/0102147 A1 | 4/2020 | Sullivan et al. | |
| 2020/0103882 A1 | 4/2020 | Sullivan et al. | |
| 2020/0151668 A1* | 5/2020 | Gu | G06Q 10/08355 |
| 2021/0240965 A1* | 8/2021 | Yadav | G08G 5/0013 |

OTHER PUBLICATIONS

Noetzel, Gunter, Locating device for ground vehicles, May 2000, English Translation of EP 0998657 A1 (Year: 2000).*
U.S. Appl. No. 62/738,697, filed Sep. 28, 2018, (73 pages).
U.S. Appl. No. 62/738,800, filed Sep. 28, 2018, (62 pages).
MIR 100 User Guide. Mobile Industrial Robots A/S. Odense, SØ. (Aug. 2018). V. 1.1, (pp. 1-42). 44 pages.
MIR 100 User Guide. Mobile Industrial Robots A/S. Odense, SØ. (Nov. 2017). V. 1.0, (pp. 1-37). 39 pages.
MIR 500 User Guide. Mobile Industrial Robots A/S. Odense, SØ. (Sep. 2019). V. 1.3, (pp. 1-100). 100 pages.
MIR Fleet Reference Guide. Mobile Industrial Robots A/S. Odense, SØ. (Jan. 2017). V. 1.0, (pp. 1-30). 32 pages.
Navitrol Pallet Detection. Navitec Systems. Espoo, Finland. (May 2018). V. 1.2, (pp. 1-8). 8 pages.
Varga, Robert. (Robert). "Vision-based Autonomous Load Handling for Automated Guided Vehicles", 2014 IEEE 10th International Conference on Intelligent Computer Communication and Processing (ICCP), Cluj Napoca, Romania, Sep. 4-6, 2014. Technical University of Cluj Napoca, IEEE. (6 pages).
Waheed, Imran. (Dec. 2006). "Trajectory / Temporal Planning of a Wheeled Mobile Robot" (Corpus ID No. 61900664) [Degree of Master of Science in the Department of Mechanical Engineering, University of Saskatchewan, Canada]. Semantic Scholar.org. (111 pages).
International Search Report for international Application No. PCT/US2021/029420, dated Aug. 18, 2021, (5 pages).
Written Opinion for international Application No. PCT/US2021/029420, dated Aug. 18, 2021, (5 pages).

* cited by examiner

MAINTAINING CONSISTENT SENSOR OUTPUT

TECHNICAL FIELD

This specification relates generally to examples of an autonomous vehicle having a sensor configured to keep constant a plane of its output signal for different positions of the autonomous vehicle.

BACKGROUND

Autonomous vehicles, such as mobile robots, are configured to travel within or between spaces, such as a warehouse or outdoor environment. For example, an autonomous vehicle may create a map of a space and plan a route through the space. The route may contain hills and valleys having different elevations and slopes. The route may also contain obstacles, such as steps, bumps, ruts, or potholes, which can affect movement of the autonomous vehicle.

SUMMARY

An example autonomous vehicle includes a body configured for movement along a surface, a sensor on the body to output a signal in a plane and to obtain information about an environment based on the signal, and a control system to use the information to determine a location of the autonomous vehicle in the environment. The sensor is configured to keep constant the plane of the signal for different positions of the body. The autonomous vehicle may include one or more of the following features, either alone or in combination.

The different positions may include different orientations of the body. The sensor may be configured to maintain a constant orientation to keep constant the plane of the signal. The sensor may be configured to keep constant the plane of the signal relative to a direction of gravity for the different orientations of the body. The autonomous vehicle may include a mount for the sensor. The mount may include liquid floating the sensor. The liquid may have a viscosity that enables the liquid to reach a level state each time an orientation of the body changes relative to gravity. The liquid may include at least water, at least liquid mercury, or other fluids containing water.

The autonomous vehicle may include a mount for the sensor. The mount may include a gimbal that is controllable to orient the sensor to keep constant the plane of the signal. The autonomous vehicle may include a gravity sensor to provide a reading that is based on an orientation of the body relative to a direction of gravity. The control system may be configured to control the gimbal based on the reading from the gravity sensor. The autonomous vehicle may include an accelerometer to provide a reading that is based on an orientation of the body. The control system may be configured to control the gimbal based on the reading from the accelerometer.

Keeping constant the plane of the signal may include keeping the signal horizontal relative to a surface. The sensor may be configured to keep constant the plane of the signal relative to a direction of gravity for different positions of the body relative to the direction of gravity. Keeping constant the plane of the signal relative to the direction of gravity may include keeping the signal perpendicular to the direction of gravity. The sensor may include a light detection and ranging (LIDAR) system and the signal output may be a laser beam. The different positions of the body may include at least one of yaw, pitch, or roll. The different positions of the body may result from up-slope or down-slope movement of the autonomous vehicle.

The sensor may be configured to maintain a constant height relative to a surface on which the autonomous vehicle is traveling for the different positions of the body. The autonomous vehicle may include a mount holding the sensor. The mount may be controllable to move relative to the body to maintain the constant height of the sensor for the different heights of the body relative to the surface. The mount may be controllable to move vertically relative to the body. The mount may be telescopic. The autonomous vehicle may include an altimeter connected to the sensor to measure a height of the sensor and to output a reading based on the height. The control system may be configured to control movement of the mount based on this reading.

The autonomous vehicle may be a mobile robot having an end effector having one or more tines for interacting with a stackable element. The sensor may include an elevation sensor to provide a reading based on a height of the body and that reading may be relative to a reference plane. The control system may be configured to control the height of the body based on the reading.

Any two or more of the features described in this specification, including in this summary section, can be combined to form implementations not specifically described herein.

The example vehicles and techniques described herein, or portions thereof, can be implemented using, or controlled by, a computer program product that includes instructions that are stored on one or more non-transitory machine-readable storage media, and that are executable on one or more processing devices to control (e.g., coordinate) the operations described herein. The example vehicles and techniques described herein, or portions thereof, can be implemented as an apparatus or electronic system that can include one or more processing devices and memory to store executable instructions to implement various operations.

The details of one or more implementations are set forth in the accompanying drawings and the description below. Other features, objects, and advantages will be apparent from the description and drawings, and from the claims.

DESCRIPTION OF THE DRAWINGS

Like reference numerals in different figures indicate like elements.

DETAILED DESCRIPTION

Described herein are examples of autonomous vehicles that automatically adjust sensor outputs to remain in the same plane or direction for different vehicle positions. For example, the sensor output may remain consistent for different vehicle orientations and heights. Autonomous vehicles used as examples herein include mobile robots (or simply "robots"); however, any appropriate type of vehicle may be used including, but not limited to, self-driving machinery or non-autonomous vehicles.

An example autonomous vehicle includes sensors, such as a light detection and ranging (LIDAR) scanner, that outputs signals to detect its surroundings. In the case of a LIDAR scanner, a laser beam is output and reflected from an object in the environment. The difference in time between the incident laser beam and the reflected laser beam is used to determine the distance to the object and, thus, the location of the object within the environment. As the autonomous vehicle traverses a route, the autonomous vehicle may move over hills and valleys having different elevations and slopes. The autonomous vehicle may also encounter obstacles, such as steps, bumps, ruts, or potholes. The hills, valleys, and/or obstacles may affect the directional output of the sensor and, as a result, may affect the autonomous vehicle's operation.

Figure 1:
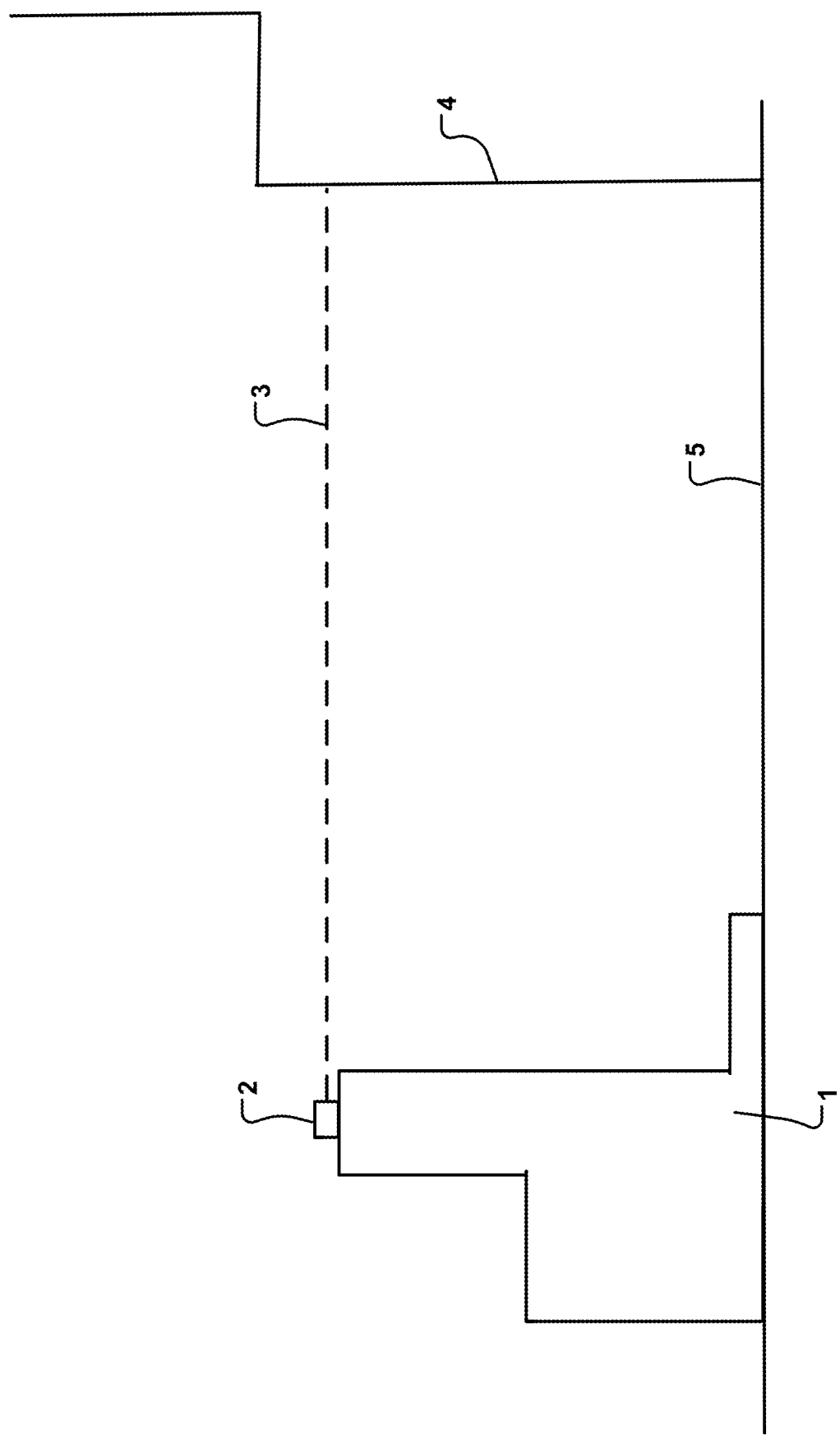
FIG. 1 is a block diagram of an autonomous vehicle moving along a horizontal surface.
Figure 2:
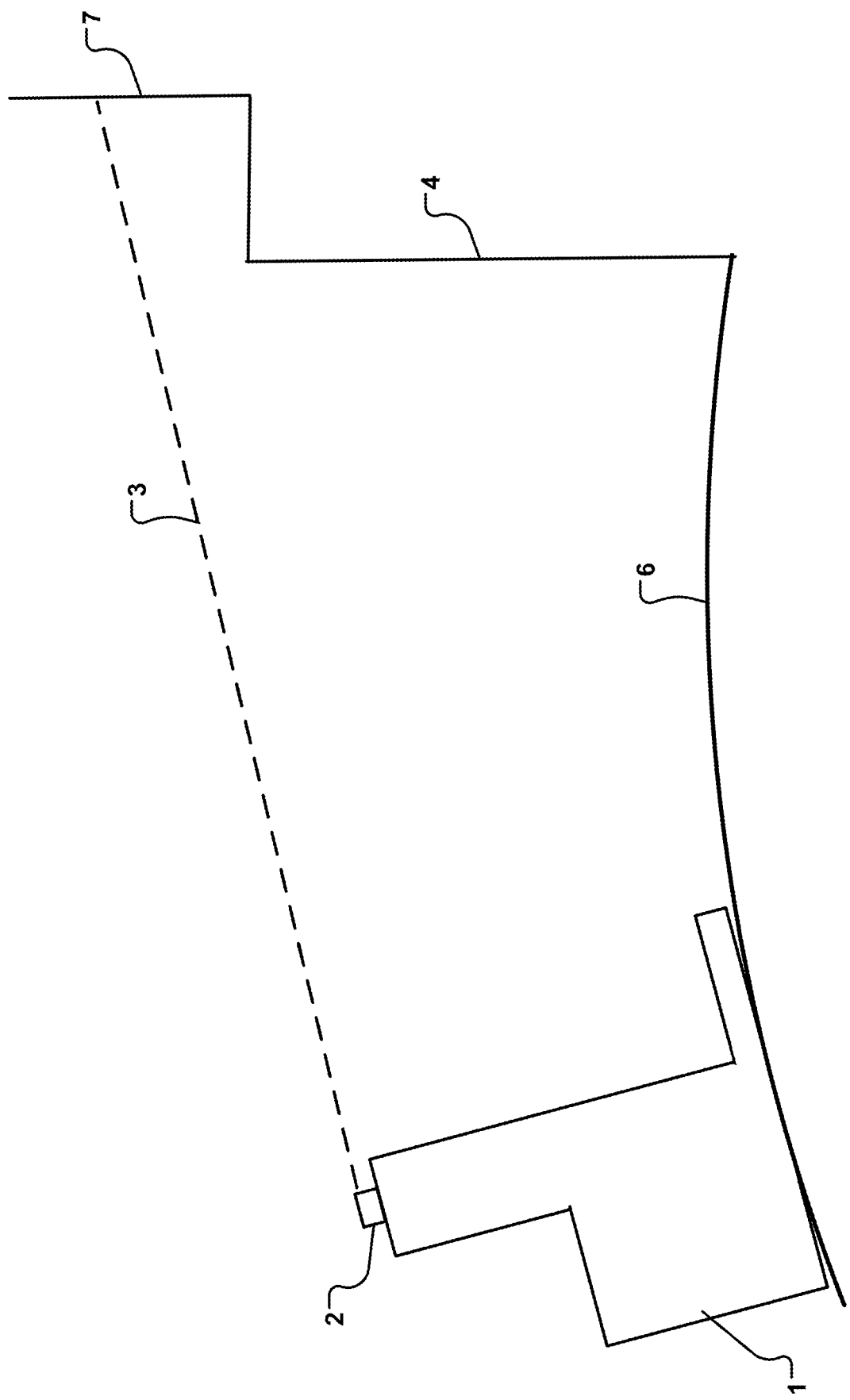
FIG. 2 is a block diagram of an autonomous vehicle moving along a curved surface.

In the example of FIG. 1, autonomous vehicle 1 includes a LIDAR scanner 2 that outputs a signal (a laser beam) to detect a wall. When autonomous vehicle 1 is traveling on a horizontal flat surface 5, signal 3 hits its intended target, namely wall 4. The autonomous vehicle is able to determine the location of the wall and, from that, to determine its current location within the environment. However, when autonomous vehicle 1 is traveling on an inclined surface 6 as shown in FIG. 2, signal 3 does not hit its intended target (wall 4) but rather, in this case, hits wall 7. As a result, determinations made by the autonomous vehicle based on the signal's reflection may be incorrect. For example, because signal 3 reflects from wall 7 rather than wall 4, localization or other determinations made by the autonomous vehicle based on the reflected signal may be incorrect. Similar errors may occur when the height of the sensor changes.

Accordingly, described herein are examples of autonomous vehicles that automatically adjust senor output to remain within the same plane for different vehicle positions. An example autonomous vehicle of this type includes a body configured for movement along a surface; a sensor on the body to output a signal in a plane and to obtain information about an environment based on the signal; and a control system to use the information to determine a location of the autonomous vehicle in the environment. The sensor is configured to keep constant the plane of the signal for at least some different positions of the body. In some examples, the sensor is configured to keep constant the plane of the signal for all different positions of the body.

Figure 3:
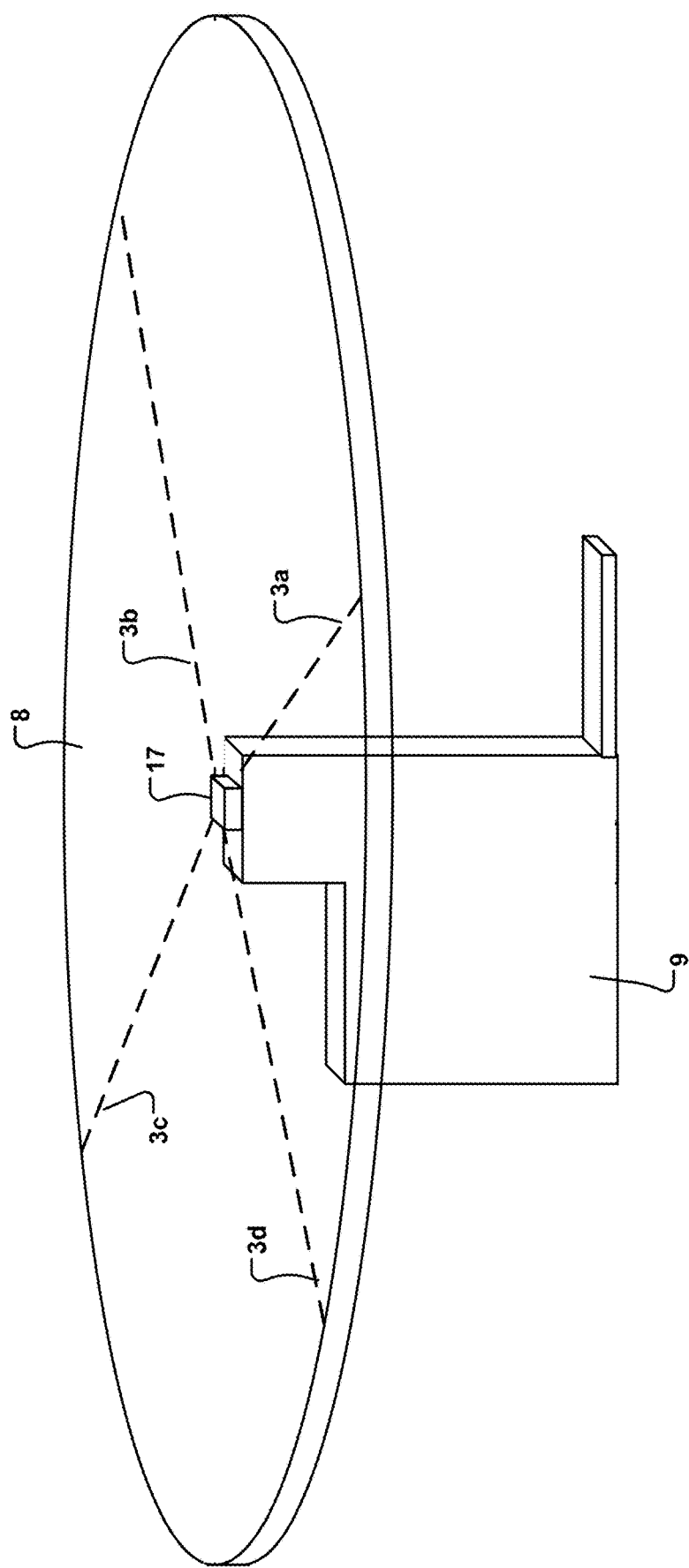
FIG. 3 is a block diagram of an autonomous vehicle and a plane showing a range over which sensor output signals may be sent from the autonomous vehicle.

In the example of FIG. 3, the plane on which sensor 17 of robot 9 outputs signals is represented conceptually by plane 8. Plane 8 shows a signal at various rotational positions 3a, 3b, 3c, and 3d, which occur at different times. The autonomous vehicle's sensor output is adjusted so that regardless of the position of the vehicle, the sensor's output signal remains within plane 8. Even when the sensor rotates, as may be the case with a LIDAR scanner, the sensor remains within plane 8. The different positions of the vehicle may include different orientations of the vehicle's body such as when the autonomous vehicle moves up an incline or down a decline. The different positions of the body may include different heights such as when the autonomous vehicle is atop a hill or other elevated surface, such as a step. The different positions of the body may include both different heights and different orientations of the body.

Figure 4:
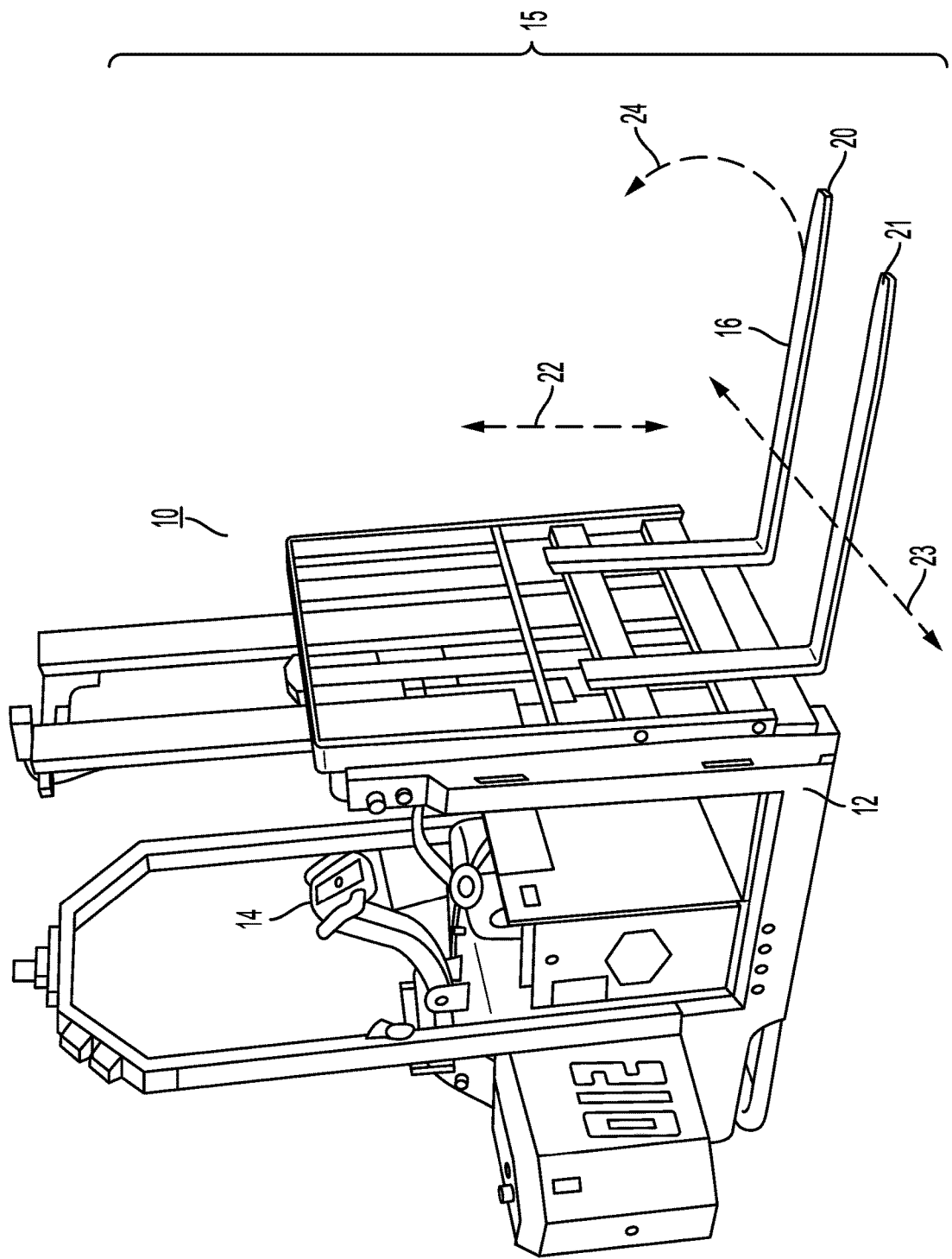
FIG. 4 is a photorealistic diagram showing a perspective view of an example autonomous vehicle.

FIG. 4 shows an example of a robot 10 that is configured to move along a surface and that has one or more sensors that may be controlled using the techniques described herein. Robot 10 is autonomously-controllable even though it includes mechanisms 14 for manual control. In an example, autonomously-controllable includes the robot moving of its own accord based on sensor inputs and, in some cases, inputs from a remote system such as a fleet control system. Robot 10 includes a body 12 having wheels (not shown) to enable robot 10 to travel across a surface, which may be the floor of a warehouse, a factory, or other terrain. Robot 10 also includes a support area 15 configured to support the weight of an element, such as a pallet, a container, or any other device to be manipulated, using an end-effector 16. In this example, robot 10 may be controlled to transport the element from one location to another location.

In the example of FIG. 4, end-effector 16 includes a fork comprised of two tines 20, 21. Other types of end-effectors may be used, such as a plate or a gripper. The tines may be configured for vertical movement in the directions of arrow 22. The vertical movement enables the tines to pick-up an element, such as a pallet or a container, and to move the element to an appropriate vertical height for placement. The vertical movement also enables the tines to reach a height of an element to be removed from a stack, a rack, or another location. The tines also may be configured for horizontal movement in the directions of arrow 23. In some examples, the tines are interconnected and, therefore, move together. In some examples, each tine may be configured for independent and separate horizontal movement along the directions of arrow 23. That is, each tine may move relative to the other tine to adjust the distance or pitch between the two. In some examples, each tine may be configured for independent and separate vertical movement along the directions of arrow 23. In some implementations, one of the tines may be movable out of the way to allow a single tine to interact with an element. For example, a tine 20 may be rotatable by 90° in the direction of arc 24, leaving tine 21 in position to interact with an element located in front of robot 10. The other tine 21 may operate similarly.

Figure 5:
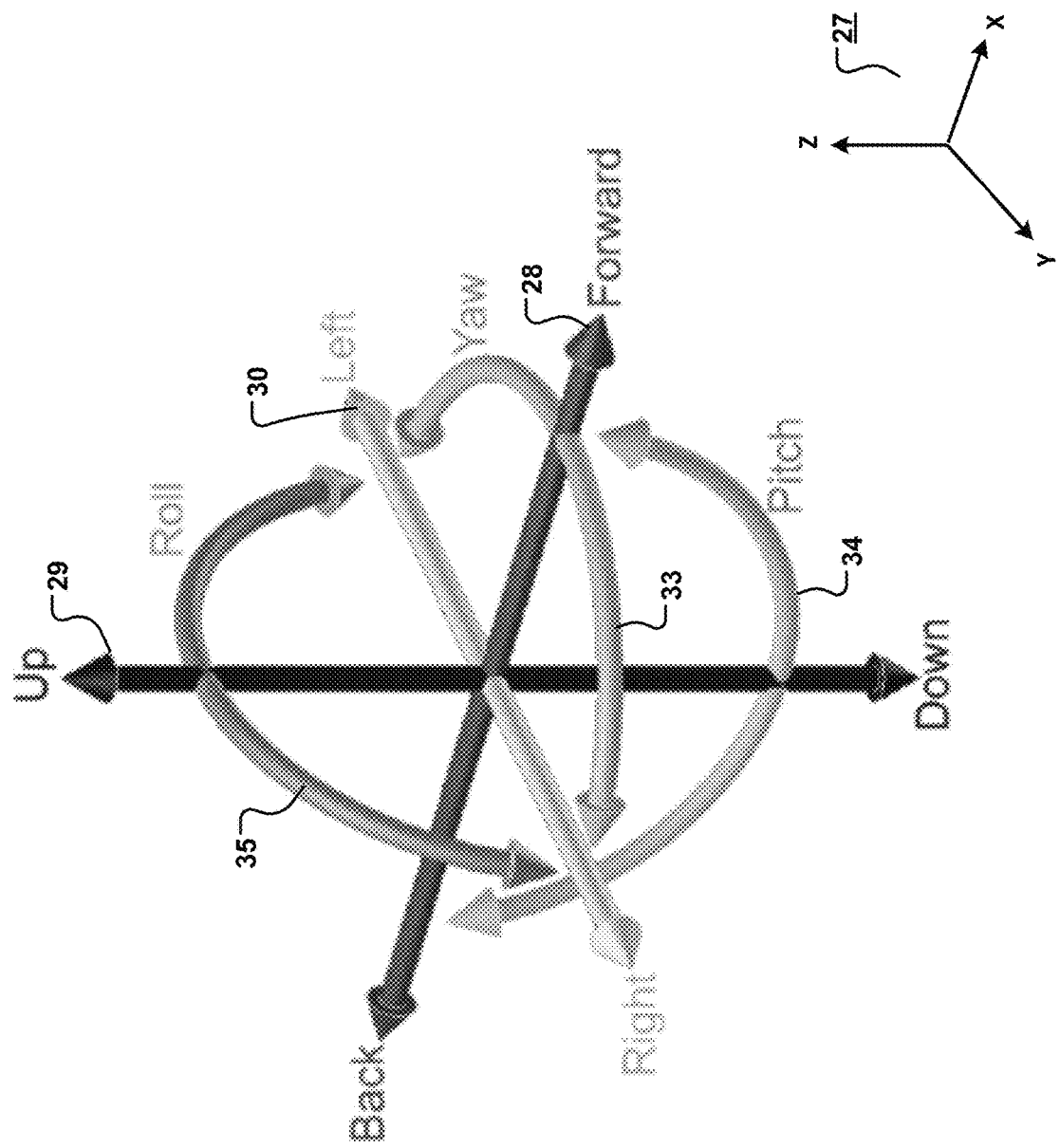
FIG. 5 is an illustration showing six degrees of freedom.

The end-effector, the robot body, or a combination of the end-effector and the robot body may move in any appropriate combination of four, five, or six degrees of freedom. FIG. 5 shows movement in six degrees of freedom graphically relative to Cartesian X, Y, and Z axes 27. The six degrees of freedom include forward/backward (surge) 28, up/down (heave) 29, left/right (sway) 30, yaw 33, pitch 34, and roll 35.

Figure 6:
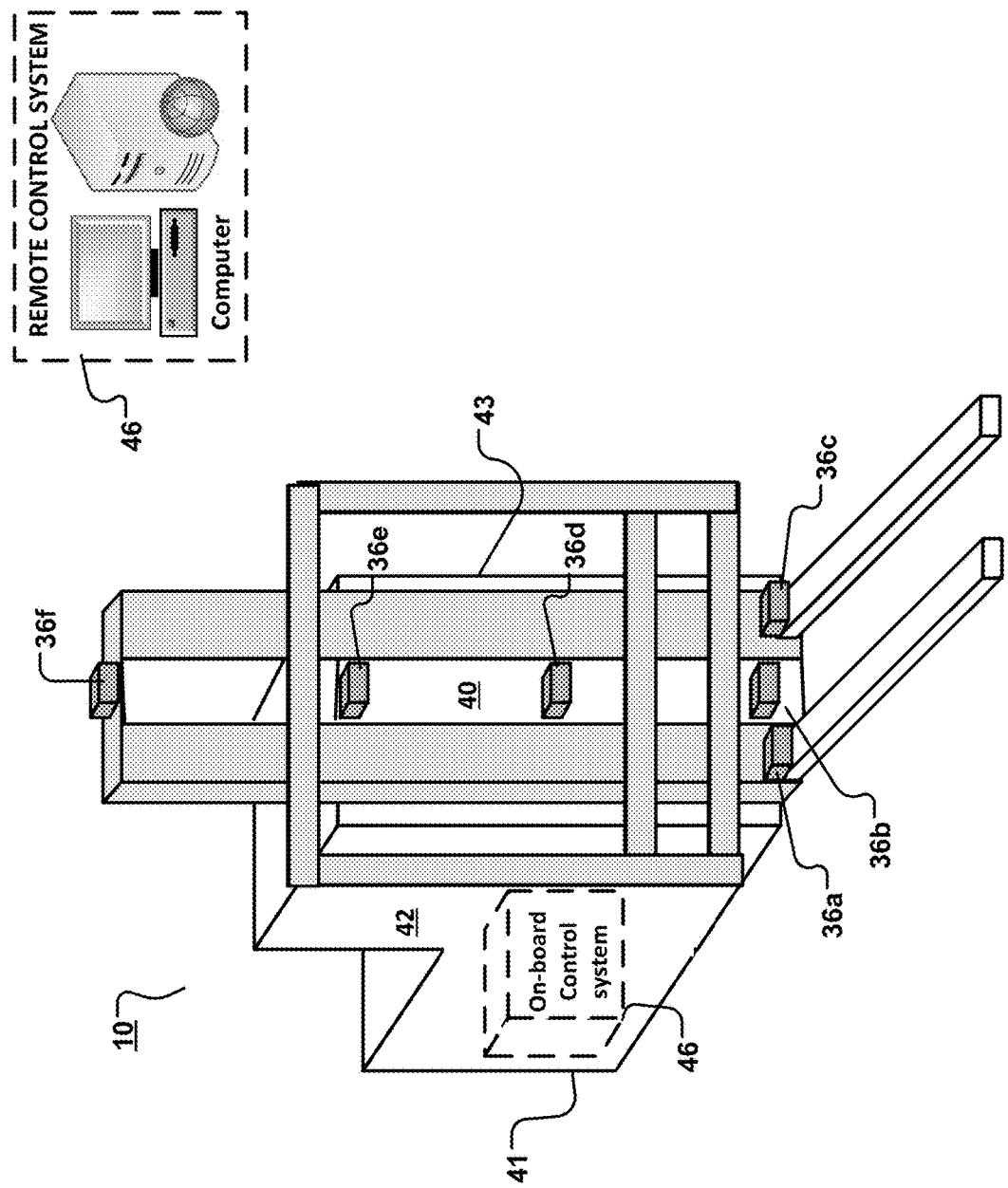
FIG. 6 is block diagram showing a perspective view of the autonomous vehicle of FIG. 1.

Referring also to the block diagram of FIG. 6, one or more sensors 36a, 36b, 36c, 36d, 36e, and 36f are located on robot 10 for use in detecting the location of the robot itself—that is, performing localization, for detecting an element to pick-up, and/or for detecting a location on which to place— for example, to stack—the element. The sensors are configured to obtain 3D data at least from locations that are in front of the end-effector. Examples of sensors include 2D and 3D sensors. For example, robot 10 may include a 3D camera, a light detection and ranging (LIDAR) scanner, an optical sensor, a sonar sensor, a time-of-flight (TOF) sensor, a radar sensor, a 2D camera sensor, one or more ultrasonic sensors, or any appropriate multiple numbers and/or combination thereof. To obtain 3D data using 2D sensors, multiple 2D sensors may be used. Notably, the example robot is not limited to these types of sensors.

In an example, robot 10 includes a 3D camera at a front 40 of the robot. A 3D camera may capture, red, green, blue, and depth (RGBD) data. In this example, the front of the robot faces the direction of travel of the robot. In the example of FIG. 3, the front of the robot may include an arc spanning 180° or less from one side of the robot to the opposite side of the robot. In an example, robot 10 may include one or multiple LIDAR scanners at a front, a back, and/or a top of the robot. Each LIDAR scanner is configured to detect objects within a sensing plane. Two or more LIDAR scanners may be configured and arranged to obtain 2D data in orthogonal sensing planes. This 2D data, when appropriately correlated and/or combined constitutes 3D information obtained from the front of the robot. Combinations of these and/or other sensors may be used to obtain 3D data representing the space in front of the robot. The 3D data may include 3D (e.g., Cartesian XYZ) coordinates representing the space.

One or more LIDAR scanners, such as sensor 36f, may be used to perform localization—also referred to as navigation—within a space. In an example, a route through a space is determined and stored on a map that is accessible to the robot. The robot moves through the space using the route map. During this movement, the robot periodically, intermittently, or sporadically determines its location, orientation, or both location and orientation within the space. This information allows the robot to confirm that it is on the route, to determine where it is on the route, and to determine if a course correction is necessary to reach its destination. The robot uses elements in the space to determine its location along the route by comparing the elements that it detects using the LIDAR scanners to expected locations of those same elements on the map. In some examples, the elements includes walls, columns, or other landmarks within a space. If those elements are in an expected location, the robot knows that is it on the route. If, however, the elements are not where expected, the robot may determine that it is not on the route. In some cases, if the physical location of a sensor changes due to changes in the robot's position such as its height and/or orientation, the sensor may not be looking in the vicinity of expected elements such as walls or other landmarks used for localization. As a result, the sensor readings may not be helpful or may be inaccurate for localization purposes. The techniques described herein address this situation.

In implementations that include multiple sensors on the front of the robot, the sensors may be located at different positions, for example at different heights. In addition, one or more the sensors may be movable on the robot. In some examples, two or more sensors 36a, 36c may be located on, and movable with, the end-effector. In some examples, one or more sensors 36d may be located at a mid-point of the robot, one or more sensors 36b may be located at a bottom of the robot, one or more sensors 36e may be located above sensors 36d, and one or more sensors 36f may be located at a top of the robot such that the vision of sensors 36f is not obstructed during operation of the robot. Sensors strategically placed at these or other locations enable the robot to capture images of elements in front of the robot even when the robot is holding an element that blocks a sensor. Sensor 36f or a portion thereof may be configured and arrange to rotate to identify objects in an unobstructed 360° field-of-view (FOV) around sensor 36f or within a FOV around sensor 36f that is less than 360°.

In some implementations, robot 10 may include sensors at locations other than the front or top of the robot. For example, sensors of the type described herein may be included on one or both sides of the robot and/or on the back of the robot. In the examples of FIG. 3, the back of the robot is the opposite side of the front 40 of the robot. The back 41 of the robot includes an arc spanning 180° or less from one side of the robot to the opposite side of the robot. The sides 42, 43 of the robot each may include an arc spanning 180° or less from the direction of travel of the robot to the direction opposite to the direction of travel of the robot. Sensors of the type described herein on the top of the robot, on one or both sides of the robot, and/or on the back of the robot may assist in or perform operations such as object detection and localization.

LIDAR scanners, 3D cameras, and/or any other robot sensors constitute a vision system for the robot. Visual data obtained by the vision system may be used to determine a location of the robot within a space being traversed. As previously noted, in some implementations, control system 46 stores a map of the space to be traversed in computer memory. Components of control system 46 are shown in dashed lines in FIG. 6 because at least part of the control system may be internal to the robot. The map may be located on the robot or at any location that is accessible to the control system. The map may include locations of landmarks, such as walls, columns, corners, windows, poles, and other distinguishable features of the space that act as references for the robot. The map may include dimensions and distinguishing characteristics, such as color, shape, texture, and so forth of landmarks, such as walls, columns, corners, windows, poles, and other distinguishable features of the space that act as references for the robot. The map may also include measurements indicating the size of the space, measurements indicating the size and locations of the landmarks, measurements indicating distances between landmarks, and coordinate information identifying where the landmarks are located in the space. The control system uses information in the map to move throughout the space and uses visual data from the vision system and data from the map to determine a location of the robot within the space. For example, the robot may identify the locations of three landmarks within the space. By knowing where the robot is relative to these landmarks, the locations of the landmarks on the map and thus within the space, and the distances between the landmarks, the control system can determine the location of the robot within the space.

Control system 46 may include circuitry and/or an on-board computing system to control operations of the robot. The circuitry or on-board computing system is "on-board" in the sense that it is located on the robot itself. The control system may include, for example, one or more microcontrollers, one or more microprocessors, programmable logic such as a field-programmable gate array (FPGA), one or more application-specific integrated circuits (ASICs), solid state circuitry, or any appropriate combination of two or more of these types of processing devices. In some implementations, on-board components of the control system may communicate with a remote computing system. This computing system is remote in the sense that it is not located on the robot itself. For example, the control system can also include computing resources distributed to a remote—for example, a centralized or cloud—service at least a portion of which is not on-board the robot. Commands provide by the remote computing system may be transferred for execution by an on-board computing system. In some implementations, the control system includes only on-board components. In some implementations, the control system includes a combination of on-board components and the remote computing system. In some implementations, the control system may be configured—for example programmed—to implement control functions and robot movement absent either local or remote input from a user. In some implementations, the control system may be configured to implement control functions, including localization, based at least in part on input from a user.

In some implementations, the remote control system may include a fleet control system. The fleet control system may include one or computing devices that operate together to control, to influence, or to instruct multiple robots of the type described herein. For example, the fleet control system may be configured to coordinate operations of multiple robots, including instructing movement of a robot to a position where an element is located and to a position where the element is to be stacked (for example, placed). For example, the fleet control system may be configured to coordinate operations of multiple robots, including instructing movement of a robot to a position where an element is to be picked-up. In some implementations, the fleet control system may store, maintain, and update the map of the space in which the robot or robots are to operate. The map may be accessed by each robot through the fleet control system or the map may be downloaded periodically, intermittently, or sporadically to all or some robots operating in the space.

In some implementations, the control system, including the remote portions thereof, may be distributed among multiple robots operating in the space. For example, one of the robots may receive the map—for example, from a fleet controller—and distribute the map to robots operating locally within the space. Similarly, one or more robots within the space may send command and control signals to other robots.

The control system, whether on-board the robot, remote from the robot, or a combination of on-board and remote, may include computer memory storing a database comprising a library of data identifying different types of elements and attributes of the different types of elements. For example, the database may include attributes identifying elements in the space used for localization such as walls, columns, or other landmarks. The attributes may include, for example, the dimensions of each element including length, width, and depth (XYZ), the material of which the element is made, indicia or markings on the elements such as color, serial number, bar codes, QR codes, and the like, and any other appropriate information that the robot may need to identify the element. This database may be accessed during localization operations to identify elements on the map and to ensure that the robot's current location is accurate.

Figure 7:
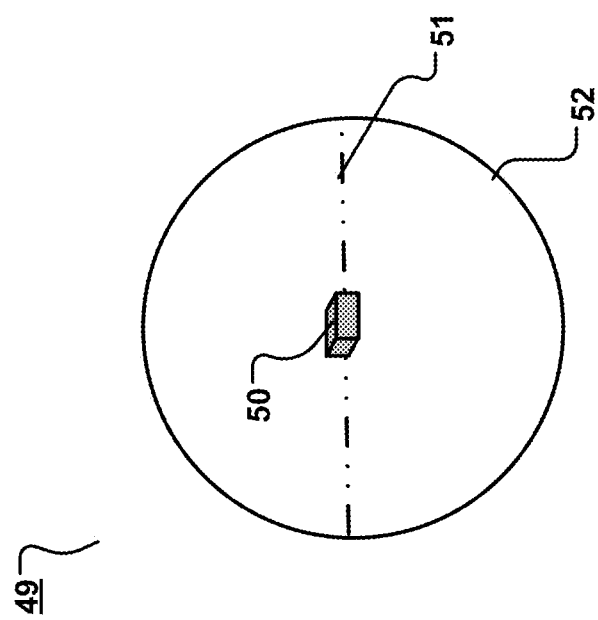
FIG. 7 is a block diagram of a sensor arrangement containing a sensor floating in liquid.

Referring to FIG. 7, one or more sensors, such as a LIDAR scanner, are configured to keep planes of their output signals constant for different positions of a robot. For example, sensor arrangement 49 includes sensor 50 floated in liquid 51 held in sensor housing 52. The liquid has a viscosity that enables the liquid to reach a level state almost immediately at a predefined temperature and pressure (such as 20° Celsius (C.) and 1 atmosphere) each time an orientation of the body changes relative to gravity. In this example, a level state includes that the surface of liquid 51 remains perpendicular to the direction of gravity for different positions of the robot. An example viscosity of the liquid is at or near the viscosity of water: 1 centipoise at 20° Celsius (C.).

Figure 8:
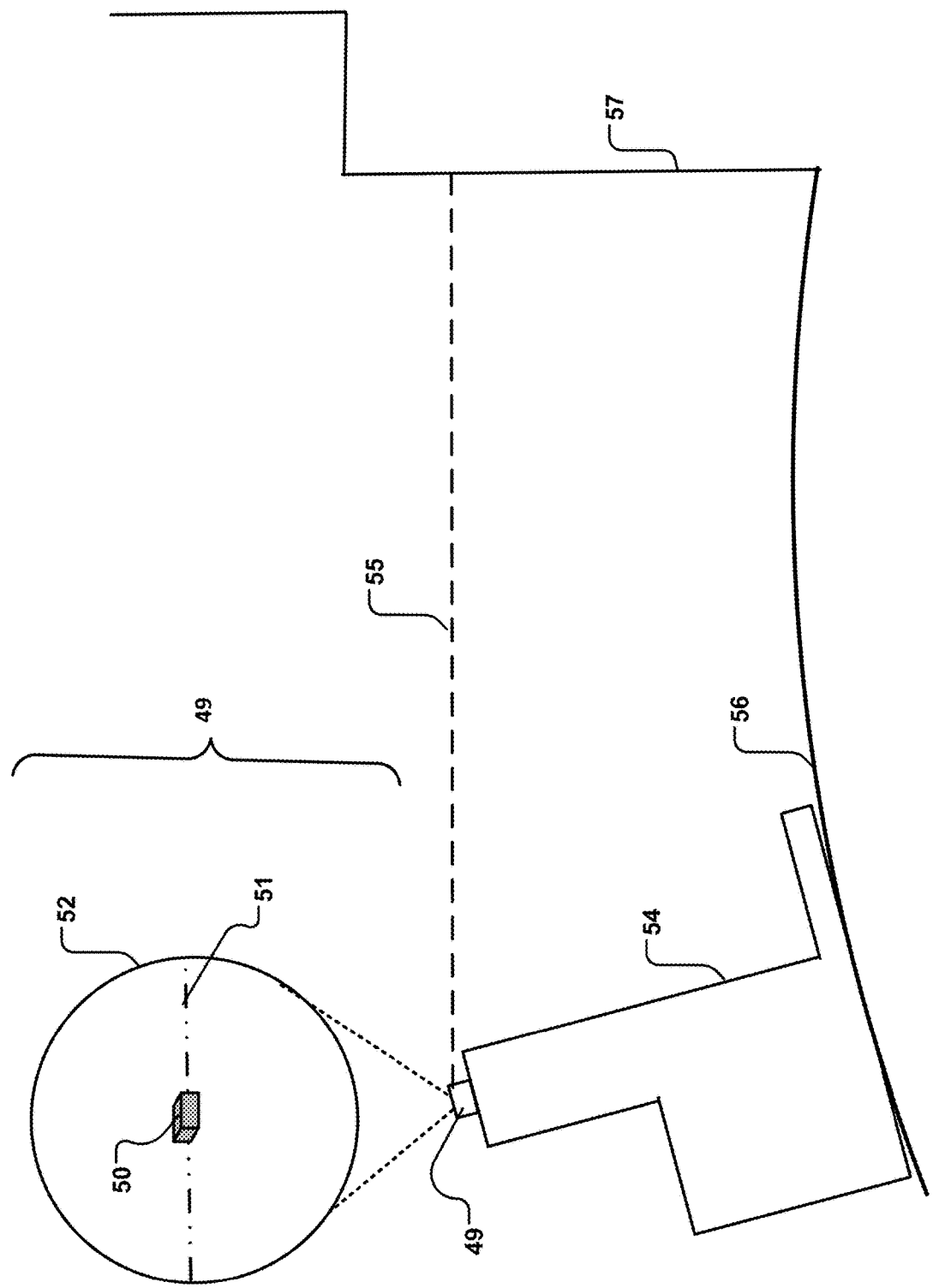
FIG. 8 is a block diagram of an autonomous vehicle having the sensor arrangement of FIG. 7 moving along a curved surface.

FIG. 8 shows sensor arrangement 49 mounted to a robot 54 moving up an incline in a manner similar to that of FIG. 2. Sensor arrangement 49 may be sensor 36f of FIG. 6. Sensor arrangement 49 is shown in blown-up view in FIG. 8 (and FIG. 9) to illustrate its components. As shown, as robot 54 moves up (or down) incline 56, the surface of the liquid 51 remains perpendicular to the direction of gravity. Because the sensor is floating in the liquid, the output signal of the sensor 55 (for example, a laser beam) also remains perpendicular to the direction of gravity for all or some different orientations of the robot. That is, as the liquid adjusts to the new orientation of the robot, so does the sensor output direction. Accordingly, as shown in FIG. 8, sensor 55 floating in liquid maintains a constant output direction for different orientations of robot 54. The output signal is therefore able to hit the intended target, namely wall 57, unlike in FIG. 2.

Figure 9:
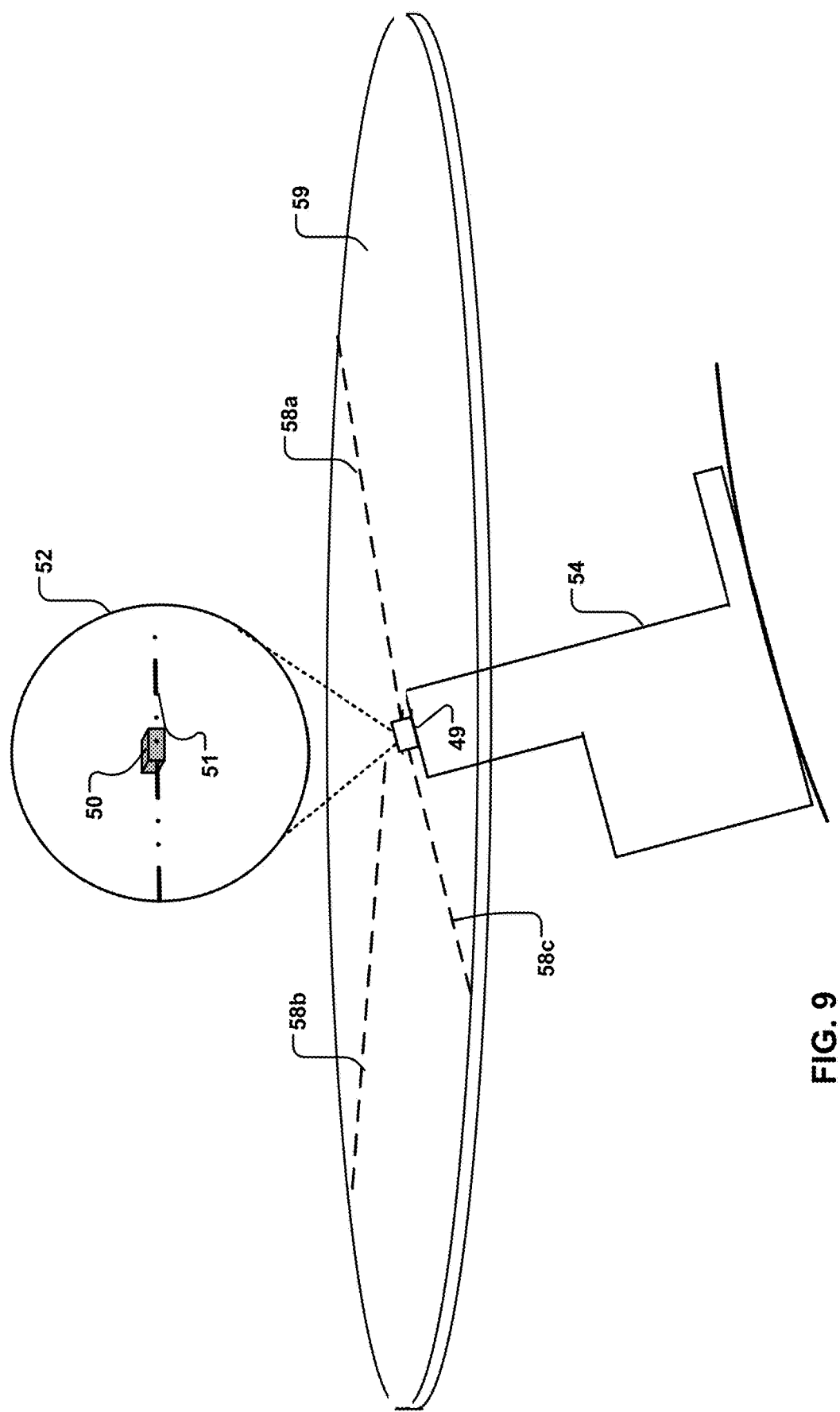
FIG. 9 is a block diagram of an autonomous vehicle having the sensor arrangement of FIG. 7 moving along a curved surface, along with a plane showing a range over which sensor output signals may be sent from the autonomous vehicle.

In the case of a sensor such as a LIDAR scanner that rotates to sense objects at different angles, the liquid allows the sensor to keep planes of its output signals constant for different rotational positions. In the example of FIG. 9, sensor 50 is a LIDAR scanner that rotates in 360°. Despite changes in the robot's rotational position, the liquid allows different outputs 58a, 58b, 58c of the sensor to remain within plane 59. So, for example, for different pitch, yaw, roll, surge, heave, and sway movements of the robot, the plane of the sensor's output signal remains constant. When the sensor does not rotate, for different pitch, yaw, roll, surge, heave, and sway movements, the direction of its output signal remains constant. When the surface on which the robot is traveling is perpendicular to the direction of gravity, the sensor remains horizontal or substantially horizontal to that surface even if a rut or pothole is hit during movement.

In some implementation, the sensor may be tethered to a structure, such as housing 52, holding the liquid. The tether may allow movement of the sensor within the liquid, but may restrict movement of the sensor to prevent the possibility of damage due, for example, to sudden unexpected movements of the robot. In some implementations, the sensor may be free-floating within the liquid, e.g., not tethered. In some implementations, the housing 52 may fully enclose the sensor and the liquid and may be fluid-tight to ensure that no liquid escapes from the housing.

Any appropriate liquid may be used that has a viscosity that enables the liquid to reach a level state quickly (e.g., within one or less or five seconds or less) each time an orientation of the body changes relative to gravity. For example, water, liquid mercury, a mixture containing water and/or liquid mercury, or a mixture containing these and/or various other liquids that provide the proper leveling characteristics may be used.

A liquid-leveling system as described in the preceding paragraphs is an example of a passive sensor leveling system. Active sensor leveling systems may also be used. For example, a gravity sensor may be attached to a sensor such as the robot's LIDAR sensor or to the robot body to provide a reading that is based on—for example, that identifies—an orientation of the robot's body relative to a direction of gravity. An example of a gravity sensor that may be used is an accelerometer. An accelerometer includes a device that measures the acceleration (the rate of change of velocity) of a body in its own rest frame. The accelerometer may send information representing changes in the robot's orientation to the control system. The control system may then actively control the orientation of the LIDAR sensor so as to keep constant a direction or a plane of its output signal for different positions of the robot. For example, the LIDAR sensor may be controlled so that its output signal, such as a laser beam, remains at the same angle relative to a surface on which the robot is traveling. In an example, the LIDAR or other sensor may be controlled so that its output signal remains perpendicular to the direction of gravity. In an example, the sensor may be controlled so that its output signal remains at a predefined angle that is not perpendicular to the direction of gravity. For example, the surface on which the robot is traveling may be consistently slanted, in which case the sensor may be controlled so that its output signal remains parallel to that inclined surface. In another example, the sensor may be controlled so that its output signal remains at the same angle relative to the surface, which angle is neither parallel to the surface nor perpendicular to the direction of gravity.

Figure 10:
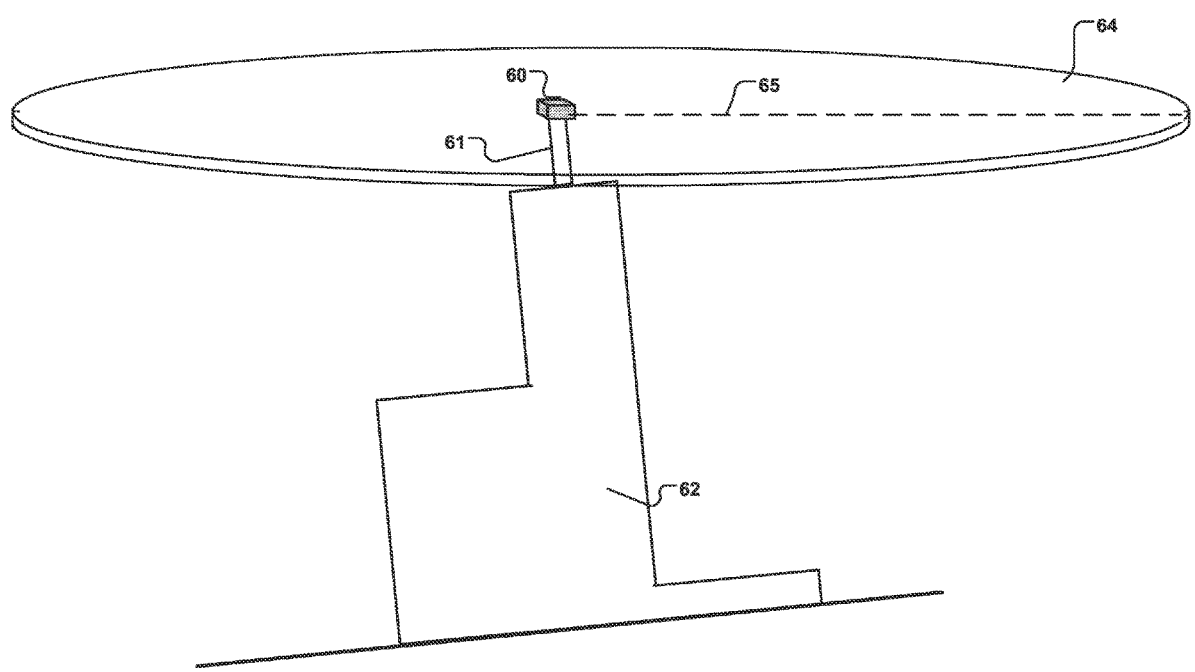
FIG. 10 is a block diagram of an autonomous vehicle moving along an inclined surface and having a sensor mounted on a gimbal.
Figure 11:
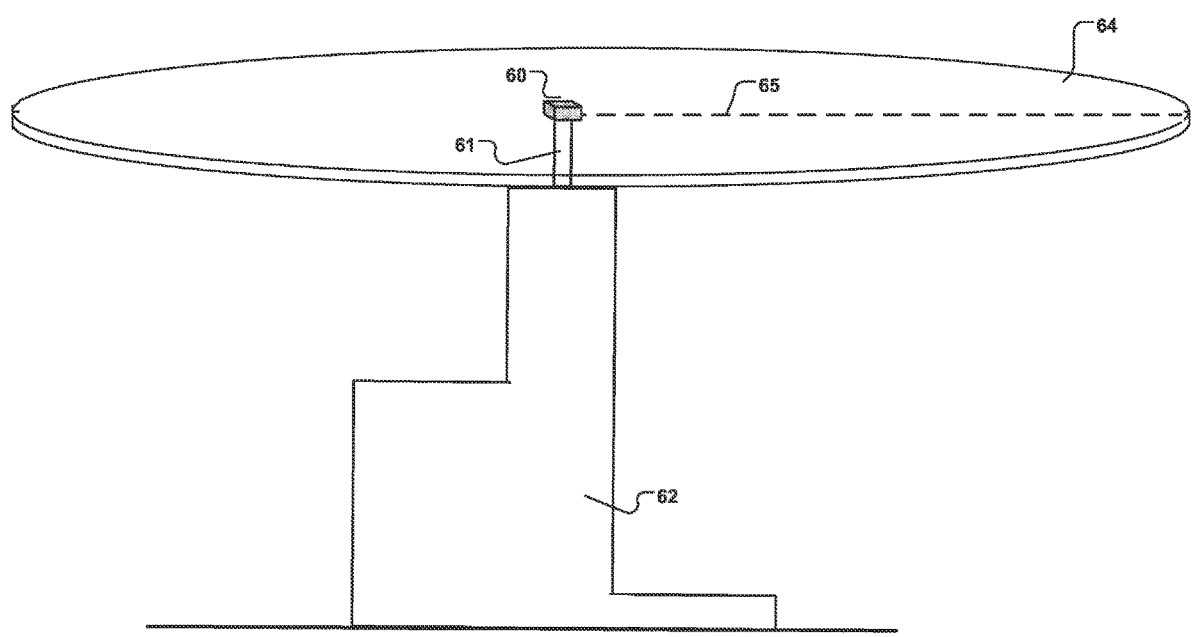
FIG. 11 is a block diagram of the autonomous vehicle of FIG. 10 moving along a horizontal surface and having a sensor mounted on a gimbal.

A sensor that is actively controlled in the preceding manner may be mounted on a gimbal. A gimbal includes a pivoted support that allows controllable axial rotation of an object connected thereto. An example of a sensor 60 mounted on a gimbal 61 of a robot 62 is shown in FIGS. 10 and 11. The gimbal may be controlled by the control system to position sensor 60 to keep its output signal 65 in the same sensor plane 64 for different orientations of the robot. When the sensor rotated, as is the case in a LIDAR scanner, the gimbal may be controlled by the control system throughout the entire arc of rotation of the sensor in order to keep the output signal 65 within plane 64.

In some implementations, a robot is configured to automatically adjust senor output to remain within the same plane for different vehicle height positions. For example, as described with respect to FIG. 2, when the height of the robot changes, the height of one or more of its sensors may also change. This can lead to erroneous sensor readings if the sensors, as a result of the height change, can no longer detect their intended targets. Accordingly, one or more sensors on the robot may be configured to maintain a constant height relative to a reference point, such as a predefined base elevation, for different heights of the robot's body.

Figure 12:
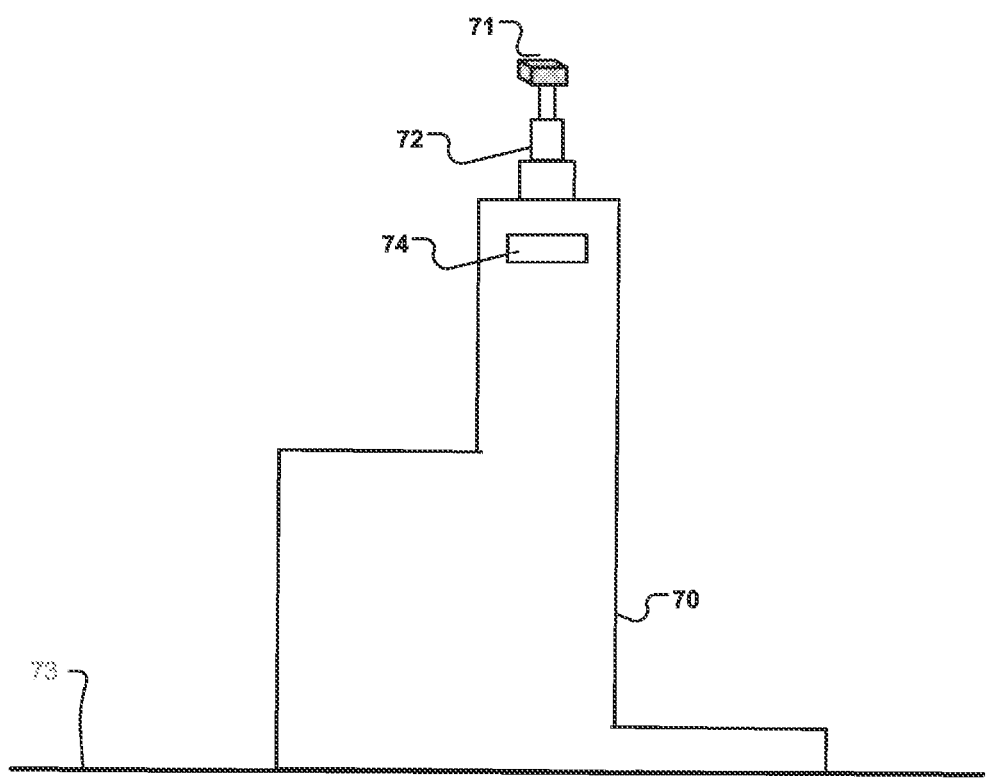
FIGS. 12 and 13 are a block diagrams of an autonomous vehicle having a sensor mounted on a telescopic mount.
Figure 13:
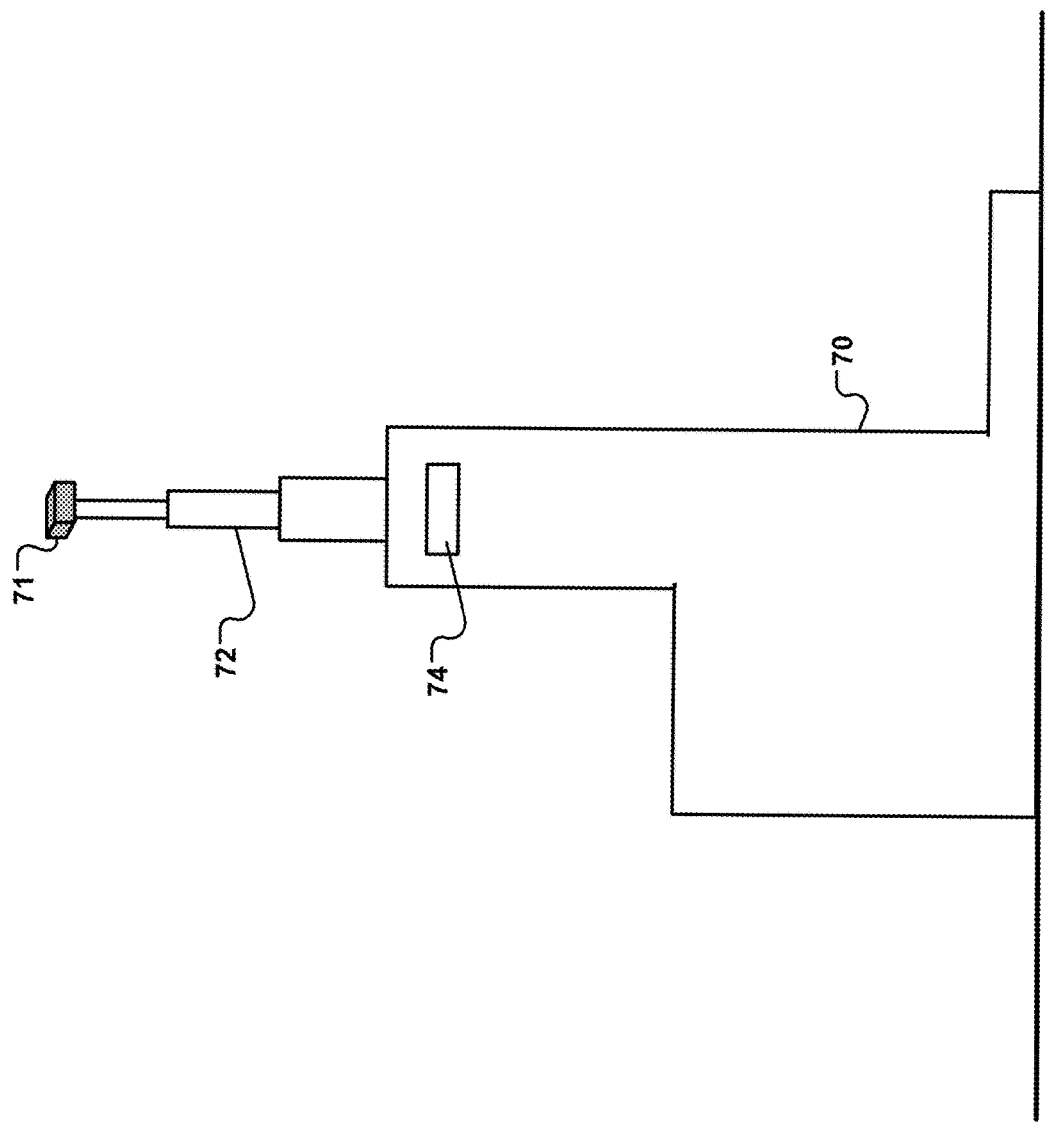

Referring to FIG. 12, an example LIDAR sensor 71 may be attached to a mount 72 that is controllable by the control system to move relative to robot body 70 to maintain a constant height of the LIDAR sensor even when the height of the body changes. In this example mount 72 is actively controllable by the control system to move vertically relative to body 70. For example, mount 72 may be telescopic as shown in FIG. 13. An elevation sensor 74 may be attached to the robot's body to provide a reading representing a height of the body relative to a predefined base elevation. An elevation sensor may be attached to the LIDAR sensor to provide a reading representing a height of the sensor relative to the base elevation. For example, an altimeter may be connected to the body and/or to a LIDAR sensor on the body to measure a height of the body and/or the LIDAR sensor and to output a reading based on the height. The reading representing the robot's height and changes thereto may be provided to the control system. The control system may then actively control the height of the LIDAR sensor so as to keep constant a height or plane of the sensor's output signal for different heights of the robot. For example, the mount may be controlled to extend to increase the height of the sensor to compensate for a decreased height of the robot. For example, the mount may be controlled to retract to decrease the height of the sensor to compensate for an increased height of the robot.

Figure 14:
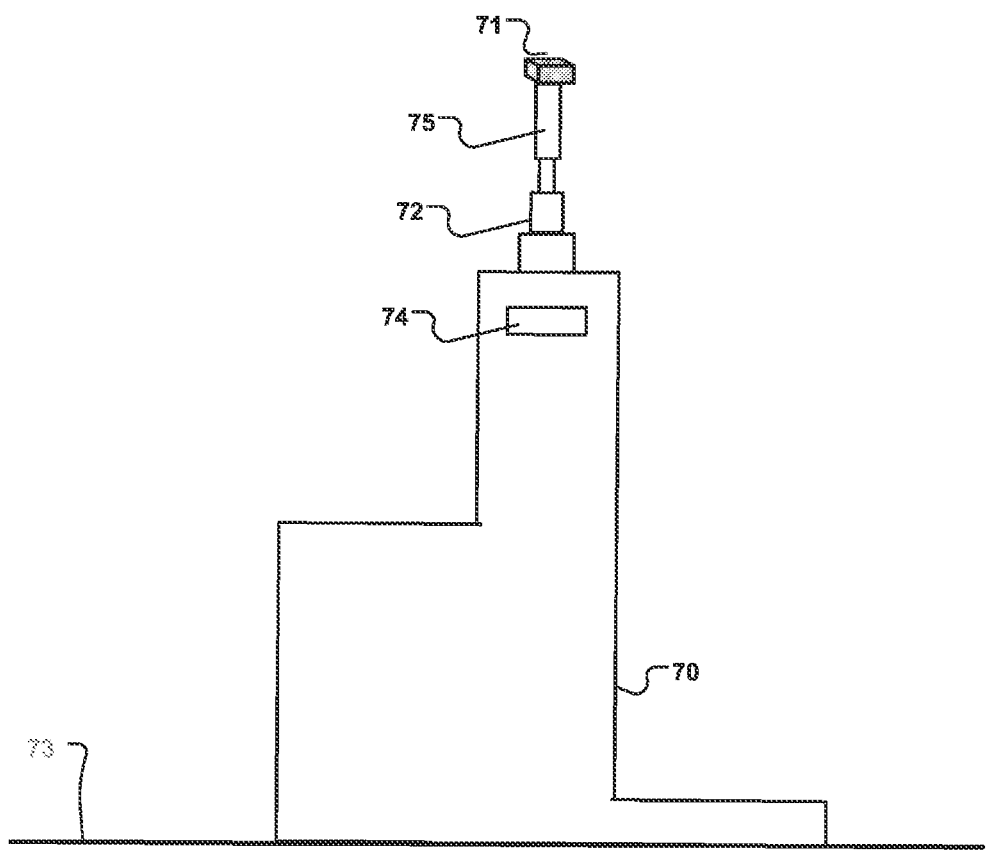
FIG. 14 is a block diagrams of an autonomous vehicle having a sensor attached to a gimbal and the gimbal attached to a telescopic mount.

The height of sensor 71 may be controlled so that its output signal, such as a laser beam, remains at the same height relative to a surface 73 or some other reference. in some implementations, sensor 71 also may be controlled so that its output signal remains perpendicular to the direction of gravity regardless of whether the robot is traveling at an incline, a decline, or over an obstacle. For example, as shown in FIG. 14, sensor 71 may be mounted to a gimbal 75. Gimbal 75 is attached to mount 72 as shown. Gimbal 75 is controllable as described herein to keep constant the plane of the sensor's output signal for different orientations of the robot 70. Thus, the control system may control the height of sensor 71 through mount 72 and the orientation of sensor 71 through gimbal 75. Accordingly, in this combination, the sensor height and orientation may both be controlled in order to keep the plane or direction of the output signal of the sensor constant for different heights and orientations of the robot. In some implementations, the gimbal and the mount may be independently controllable so that the orientation may be controlled independently, the height may be controlled independently, or the orientation and the height may be controlled in combination.

Thus, the robot may be configured to automatically adjust the physical positioning of one or more of its sensors so that the output of that sensor remains within the same plane or direction for different robot orientations and heights using combinations of two or more of the techniques described herein.

Gimbal 75 and/or mount 72 may be controlled so that the output signal of the sensor remains at a predefined angle that is not perpendicular to the direction of gravity. For example, the surface on which the robot is traveling may be consistently slanted, in which case the position of the sensor may be controlled so that its output signal remains at a predefined height and also parallel to the surface. In another example, the position of the sensor may be controlled so that its output signal remains at a predefined height and so that its output signal remains at the same angle relative to the surface on which the robot is traveling, which angle is neither parallel to the surface on which the robot is traveling nor perpendicular to the direction of gravity.

In some cases, sensor height, sensor orientation, or both sensor height and orientation may be actively controlled as described herein in order to vary the plane of the output signal either in terms of height or orientation. For example, sensor height, sensor orientation, or both sensor height and orientation may be actively controlled to change based on changing environmental conditions. In an example, a robot may traverse a route that takes it from a first building, to the outside, and finally into a second building. In each space—the first building, the outside, and the second building—points of reference that enable the robot to perform localization may be at different heights. Accordingly, the height of the sensor may be changed and set based on the location of the robot. For example, the robot may include a global positioning system (GPS) that sends information about its location to the control system. The control system may then adjust the height of one or more sensors on the robot based on the location of the robot as determined by its GPS coordinates. In this example, the height of a sensor may be different in the first room, the outside, and the second room. The appropriate heights for the different spaces may then be maintained while in that space in the manner described herein.

Similarly, the orientation of one or more sensors may be actively controlled to achieve a desired orientation based on a current location of the robot. For example, if a point of reference that enables the robot to perform localization is 45° relative to the horizontal in a first room and 60° relative to the horizontal in a second room, the orientation of the sensor may be controlled to be 45° relative to the horizontal while the robot is in the first room and 60° relative to the horizontal while the robot is in the second room, as determined by GPS coordinates.

As was the case above, both the height and the orientation may be actively controlled based on the location of the robot.

The example autonomous vehicles described herein may be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing can be performed by one or more programmable processors executing one or more computer programs to perform the functions described herein. All or part of the testing can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any mechanical or electrical connection herein may include a direct physical connection or an indirect connection that includes intervening components.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. An autonomous vehicle comprising:
a body configured for movement along a surface;
a sensor on the body to output a signal in a plane and to obtain information about an environment based on the signal; and
a control system to use the information to determine a location of the autonomous vehicle in the environment;
wherein the sensor is configured to keep constant the plane of the signal for different positions of the body;
wherein the different positions comprises different orientations of the body;
wherein the autonomous vehicle further comprises a mount for the sensor, the mount comprising liquid floating the sensor, the liquid having a viscosity that enables the liquid to reach a level state each time an orientation of the body changes relative to gravity; and
wherein the control system is at least partly onboard or at least partly remote from the autonomous vehicle and comprises, alone or in combination, one or more microcontrollers, one or more microprocessors, programmable logic, one or more application-specific integrated circuits (ASICs), or solid state circuitry.

2. The autonomous vehicle of claim 1, wherein the liquid comprises at least water.

3. The autonomous vehicle of claim 1, wherein the liquid comprises at least liquid mercury.

4. The autonomous vehicle of claim 1, wherein keeping constant the plane of the signal comprises keeping the signal horizontal relative to the surface.

5. The autonomous vehicle of claim 1, wherein keeping constant the plane of the signal comprises keeping the signal perpendicular to the direction of gravity.

6. The autonomous vehicle of claim 1, wherein the sensor comprises a light detection and ranging (LIDAR) system; and
wherein the signal output comprises a laser beam.

7. The autonomous vehicle of claim 1, wherein the different positions of the body comprise at least one of yaw, pitch, or roll.

8. The autonomous vehicle of claim 1, wherein the different positions of the body result from up-slope or down-slope movement of the autonomous vehicle.

9. The autonomous vehicle of claim 1, wherein the sensor is controllable to maintain a constant height relative to the predefined elevation for different inclines of the body.

10. The autonomous vehicle of claim 1, wherein the mount is controllable by the control system to move relative to the body to maintain a constant height of the sensor relative to a predefined surface.

11. The autonomous vehicle of claim 1, wherein the mount is controllable to move vertically relative to the body.

12. The autonomous vehicle of claim 1, wherein the mount is telescopic.

13. The autonomous vehicle of claim 1, further comprising:
an altimeter connected to the sensor to measure a height of the sensor and to output a reading based on the height;

wherein the control system is configured to control movement of the mount based on the reading.

14. The autonomous vehicle of claim 1, wherein the autonomous vehicle comprises a mobile robot comprising an end effector having one or more tines for interacting with a stackable element.

15. The autonomous vehicle of claim 1, wherein the sensor comprises an elevation sensor to provide a reading based on a height of the body relative to a reference plane height, the height comprising a position of the body; and
   wherein the control system is configured to control the mount based on the reading.

16. The autonomous vehicle of claim 1, wherein the sensor comprises an elevation sensor to provide a reading representing a height of the body, the height comprising a position of the body; and
   wherein the control system is configured to control a height of the sensor based on the reading.

17. The autonomous vehicle of claim 1, wherein the sensor is movable relative to the body to keep constant a height of the sensor relative to a. predefined elevation.

18. The autonomous vehicle of claim 1, wherein the mount is controllable to move relative to the body to maintain a constant height of the sensor relative to a predefined elevation.

19. The autonomous vehicle of claim 18, wherein the mount is controllable to move vertically relative to the body.

20. The autonomous vehicle of claim 19, wherein the mount is telescopic.

* * * * *